Figure 1:
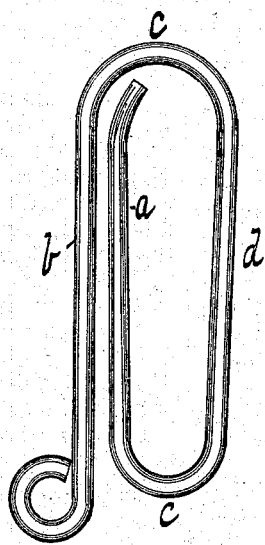

W. S. DAVIS.
CLOTHES-PINS.

No. 186,314.  Patented Jan. 16, 1877.

Witness.
John R. Mason
Wm. H. Simmons

Inventor
William S. Davis
Per C. W. Franklin Searcy
Atty.

UNITED STATES PATENT OFFICE.

WILLIAM S. DAVIS, OF PITTSFIELD, MAINE, ASSIGNOR OF ONE-HALF HIS RIGHT TO WARREN L. PARKS, OF SAME PLACE.

IMPROVEMENT IN CLOTHES-PINS.

Specification forming part of Letters Patent No. 186,314, dated January 16, 1877; application filed December 7, 1876.

*To all whom it may concern:*

Be it known that I, WILLIAM S. DAVIS, of Pittsfield, in the county of Somerset and State of Maine, have invented certain new and useful Improvements in Clothes-Pins; and I do hereby declare that the following is a full, clear, and exact description thereof, that will enable others skilled in the art to which it appertains to make and use the same, reference being had to the accompanying drawings, forming a part of this specification, in which—

Figure 1 shows a side view of my invention.

My invention consists of an improved clothes-pin formed from a single wire of sufficient size to give the requisite stiffness and spring to the pin. This wire may, of course, be galvanized or coated with any well-known composition for preserving it from rust or the action of the weather.

My invention can be best described by reference to the drawing, in which $a\ b$ show the tangs, between which the line is held, while $c\ c$ show the curved portion of the pin which gives the spring, and with the side $d$ forms a loop, by which it may be conveniently handled. The outer tang $b$ is elongated below the loop for convenience in use.

What I claim as my invention, and desire to secure by Letters Patent, is—

As a new article of manufacture the within-described clothes-pin made from a single wire, forming the tangs $a\ b$, curves $c\ c$, and loop $d$, substantially as shown and described.

In testimony that I claim the foregoing I have hereunto set my hand this 4th day of December, 1876.

WILLIAM S. DAVIS.

Witnesses:
WARREN L. PARKS,
LLEWELYN PARKS.